United States Patent
Ohira

Patent Number: 6,113,278
Date of Patent: Sep. 5, 2000

[54] ROLLING BEARING FOR A DENTAL INSTRUMENT HAND-PIECE

[75] Inventor: Koya Ohira, Kuwana, Japan

[73] Assignee: NTN Corporation, Osaka, Japan

[21] Appl. No.: 08/571,471

[22] Filed: Dec. 13, 1995

[30] Foreign Application Priority Data

Dec. 27, 1994 [JP] Japan .................................. 6-324349

[51] Int. Cl.[7] .............................. F16C 33/44; F16C 33/56
[52] U.S. Cl. ........................... 384/527; 384/576; 384/902
[58] Field of Search .................................. 384/527, 576, 384/523, 902

[56] References Cited

U.S. PATENT DOCUMENTS 4,238,538  12/1980  Manwiller .

FOREIGN PATENT DOCUMENTS

| | | | |
|---|---|---|---|
| 2840413 | 3/1979 | Germany | 384/527 |
| 0139284 | 12/1979 | Germany | 384/527 |
| 0010140 | 1/1980 | Japan | 384/527 |
| 1299316 | 12/1989 | Japan | 384/527 |
| 2118216 | 3/1990 | Japan | 384/902 |
| 0146314 | 6/1990 | Japan | 384/527 |
| 3117722 | 5/1991 | Japan | 384/527 |
| 3272320 | 12/1991 | Japan | 384/527 |
| 5-043884 | 7/1993 | Japan . | |
| 6173956 | 6/1994 | Japan | 384/527 |
| 0770060 | 3/1957 | United Kingdom | 384/902 |

*Primary Examiner*—David A. Bucci
*Assistant Examiner*—Matthew A. Kaness
*Attorney, Agent, or Firm*—Arent Fox Kitner Plotkin & Kahn, PLLC

[57] ABSTRACT

A rolling bearing for use in a dental hand-piece which can withstand sterilizing temperatures ranging from 135–200 °C., and which can be rotated at a speed of 300000 rpm or higher with a minimum amount of lubricant used. This rolling bearing is used in a hand-piece having a shaft to which a dental rotary cutting tool is detachably mounted, a turbine fixed to the shaft, and a passage for introducing compressed air for driving the turbine. The rolling bearing has a retainer formed by sintering a polyimide resin powder so that it has 5–20% by volume of mutually communicating pores and impregnating the sintered member thus formed with a fluorinated oil.

3 Claims, 3 Drawing Sheets

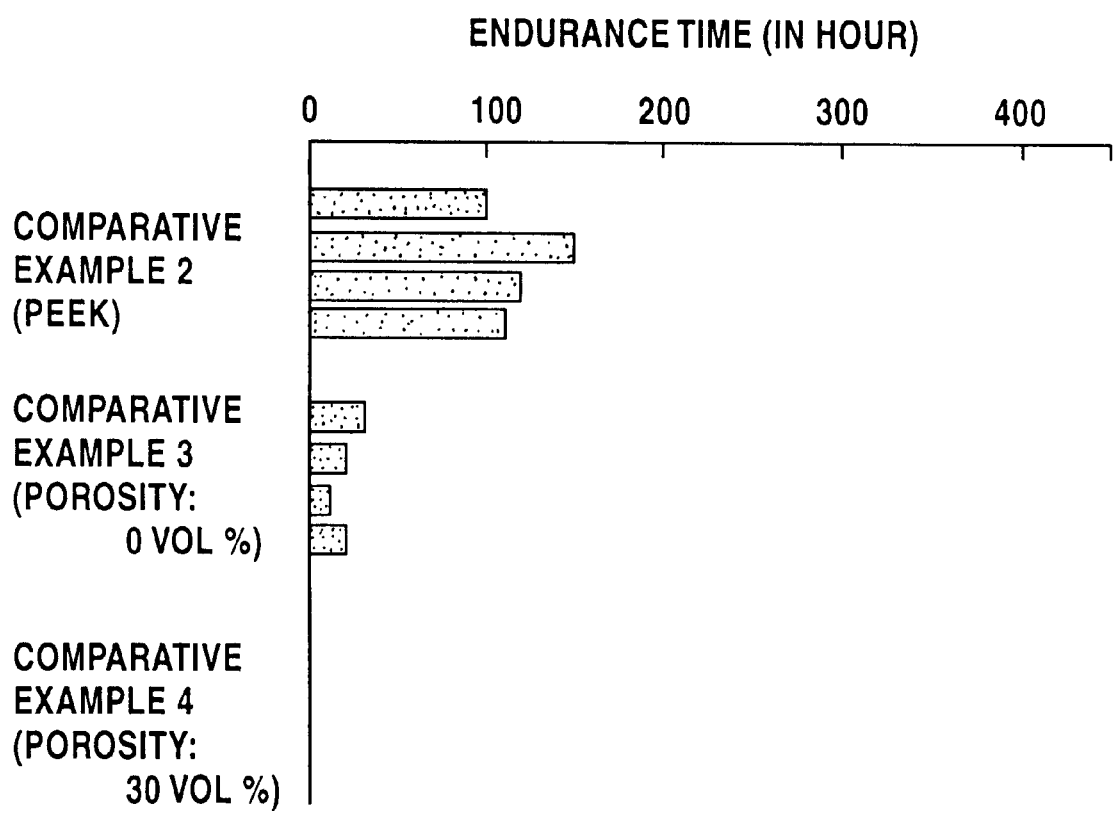

ROLLING BEARING FOR A DENTAL INSTRUMENT HAND-PIECE

BACKGROUND OF THE INVENTION

This invention relates to a rolling bearing for use in a hand-piece of a dental instrument for boring and cutting teeth.

Some conventional hand-pieces for dental instruments can rotate dental cutting tools mounted on their shafts at a ultra-high speed of 300000 rpm or higher.

FIG. 1 shows a conventional such hand-piece. It comprises a shaft 4 to which a dental cutting tool 3 is detachably mounted, a turbine 5 secured to the shaft 4, and a passage 6 for introducing compressed air for driving the turbine 5. The shaft 4 is rotatably supported by a rolling bearing 2. A passage 7 introduces pressurized water.

Such a hand-piece is required to be easy to handle, lightweight and quiet in operation. Thus, its bearing assembly also has to be lightweight and quiet. Thus, its retainer for rolling elements is formed e.g. from a polyamide resin, a material known for its high lubricity and flexibility.

Since such a hand-piece is used in the mouth of a patient, the amount of a lubricant used for lubricating its bearing assembly has to be as small as possible. Thus, conventional bearing assemblies of this type were lubricated by dripping a small amount of lubricating oil, or with oil mist mixed and diluted with compressed air.

Such a hand-piece is exposed to a hot (135° C. or higher) vapor for sterilization (or autoclaving). Today, such sterilization is carried out at an even higher temperature or using a solvent to prevent infection with the HIV virus in particular. Thus, such a hand-piece is required to have a high chemical resistance and withstand temperatures ranging from 135° C. to about 200° C.

However, conventional dental hand-pieces having a synthetic resin retainer are unsatisfactory in heat resistance, so that they cannot withstand sterilizing temperatures higher than 135° C.

In Examined Japanese Patent Publication 5-43884, the applicant of this invention proposed a rolling bearing for use in aeronautical and space equipment. Its retainer is made of a polyamideimide resin and impregnated with a completely fluorinated oil. But since the porous polyamideimide resin used in this publication is a melt type resin, there is the possibility that the retainer may melt and the bearing become unusable if the supply of lubricating oil stops. Also, due to its high moisture-absorbing speed, extreme care must be taken to control the quality of the material powder and end products.

In short, there was no rolling bearing assembly for use in a dental hand-piece which can withstand temperatures exceeding 135° C., which can be used at ultra-high speed of 300000 rpm or higher, while requiring only a very small amount of lubricant, and which can be formed from a material which can be handled easily.

An object of this invention is to provide a rolling bearing assembly for use in a hand-piece which can withstand sterilization at temperatures of 135–200° C., which can be rotated at high speeds of 300000 rpm and higher with a minimum consumption of lubricant, and whose retainer never melts even if the supply of lubricant stops completely.

SUMMARY OF THE INVENTION

According to this invention, there is provided a rolling bearing for use in a hand-piece having a shaft to which a dental rotary cutting tool is detachably mounted, and a turbine fixed to the shaft to be driven by compressed air, the rolling bearing assembly rotatably supporting the shaft and having a retainer formed by sintering a polyimide resin powder to form a sintered body having 5–20% by volume of mutually communicating pores and impregnating the sintered member thus formed with a fluorinated oil.

The retainer of the rolling bearing according to this invention is formed from a sintered polyimide resin. Mutually communicating pores are formed uniformly between the sintered resin particles. By impregnating this resin member with a fluorinated oil, the oil penetrates into the pores and is stably retained therein. Because of its low volatility, it will never volatilize in a short time, so that the retainer can be sufficiently lubricated even with a lubricant film having a thickness of a monomolecular film. Thus, even when a large centrifugal force acts on the bearing assembly by rotating it at high speed, the lubricant will never scatter or ooze out excessively, keeping high lubricity for a prolonged period of time. Also, the retainer will never be worn even if the supply of lubricant should run out. Such a bearing can be rotated at speeds of 300000 rpm or higher with a minimum consumption of lubricant.

Due to high heat resistance of the fluorinated oil, it is possible to repeatedly sterilize the rolling bearing assembly at such high temperatures as 135–200° C.

Other features and objects of the present invention will become apparent from the following description made with reference to the accompanying drawings, in which:

BRIEF DESCRIPTION OF THE DRAWINGS

FIG. 5 is a graph showing the durability in time of Comparative Examples 2–4.

DETAILED DESCRIPTION OF THE PREFERRED EMBODIMENT

The polyimide (PI for short) resin used in this invention has excellent heat resistance, chemical resistance, mechanical properties and electric insulating properties. As the PI resin, MELDIN (registered trademark) made by Dixon in USA may be used.

The PI resin used in the present invention has 5–20% by volume of pores that communicate with each other. It is formed into the shape of a conventional retainer by pressurizing and calcining. Its pore rate is controlled to 5–20% by volume by adjusting the average particle size of the material powder and/or the molding pressure. This porous resin member may be formed by molding the material powder under pressure at room temperature and then calcining it in an inert gas atmosphere or a pressurized atmosphere, by compression molding, by ram extrusion or by CIP.

The fluorinated oil used in this invention is a compound generally called perfluoropolyether (PFPE) or perfluoropolyalkylether (PFAE). Commercially available such oils include FOMBLIN made by Monthflous in Italy, KRYTOX made by Du Pont and DEMNUM made by Daikin Kogyo.

Such fluorinated oils are extremely stable and inert, with excellent heat resistance, chemical resistance, oxidation resistance, solvent resistance and lubricity. Also, they never produce solid degraded products even when exposed to high temperature or high-energy ray. They are also low in steam pressure (e.g. $10^{-13}$ Torr at 20° C.) and flow point (e.g. −80° C.).

To effectively eliminate air and water remaining in the communicating pores of the retainer made of PI resin, the retainer is preferably impregnated with a fluorinated oil at a high temperature in low-pressure atmosphere. By removing excess fluorinated oil after impregnation, a desired bearing retainer is obtained.

EXAMPLE 1

Figure 1:
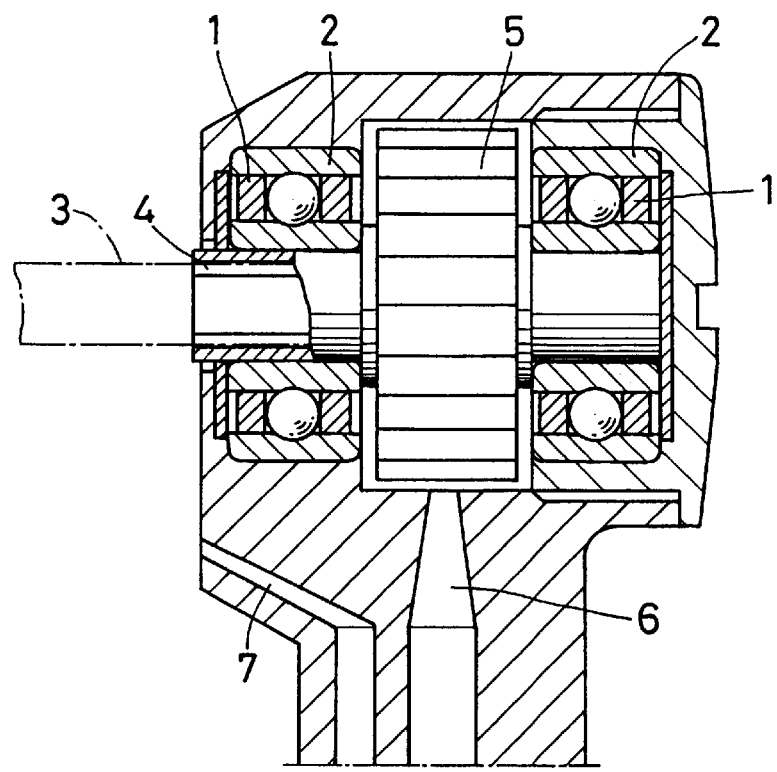
FIG. 1 is a sectional view of a dental hand-piece.
Figure 2:
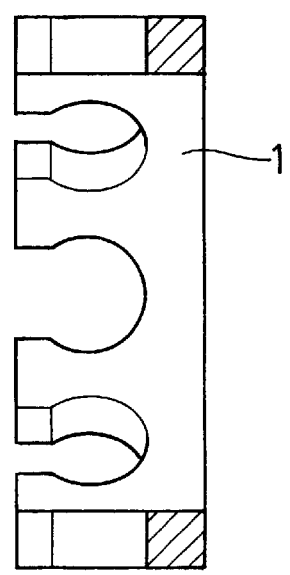
FIG. 2 is a sectional view of a retainer.

A porous PI member (MELDIN 8100 made by Dixon; 17% pores in volume percent) was immersed in a fluorinated oil (FOMBLIN made by Monteflous) kept at 23° C., while reducing the pressure to 1 Torr, to impregnate it with the fluorinated oil. Excess oil was wiped off with a clean cloth after impregnation. FIG. 2 shows the thus formed retainer 1 for a rolling ball bearing. This retainer 1 was mounted in a radial ball bearing having the specifications shown below. FIG. 1 shows the thus obtained rolling bearing 2 for a hand-piece.

Specifications of the radial ball bearing: inner diameter of the inner ring: 3.175 (mm), outer diameter of the outer ring: 6.350 (mm), width of the raceway: 2.8 mm, retainer (5.28 mm in outer diameter, 4.20 mm in inner diameter, and 1.7 mm wide)

Figure 3:
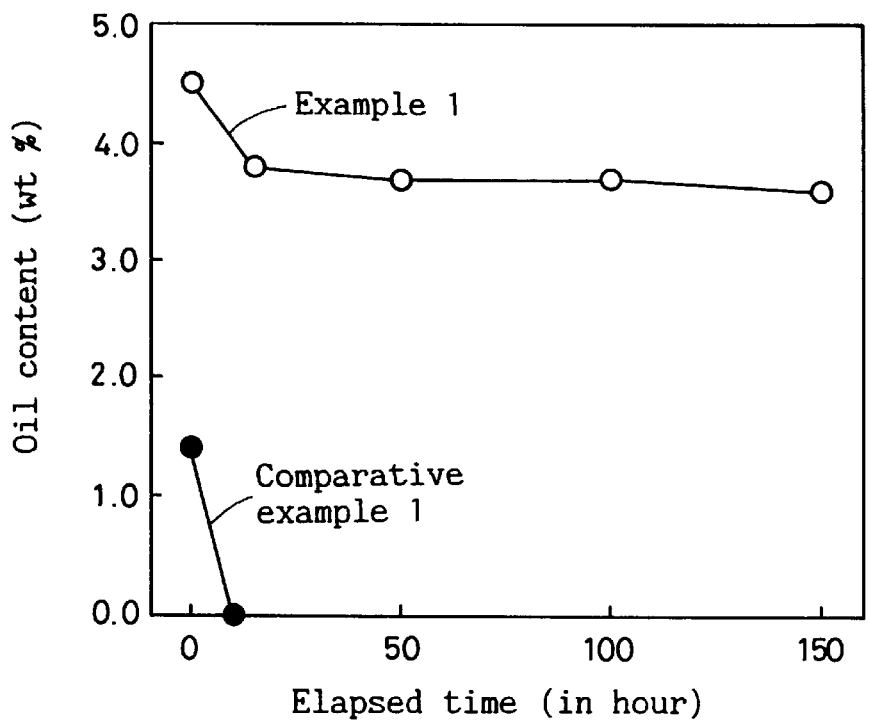
FIG. 3 is a graph showing the relationship between the oil contents of the retainers used in Example 1 and Comparative Example 1 and the time during which they were put in a high-temperature atmosphere.
Figure 4:
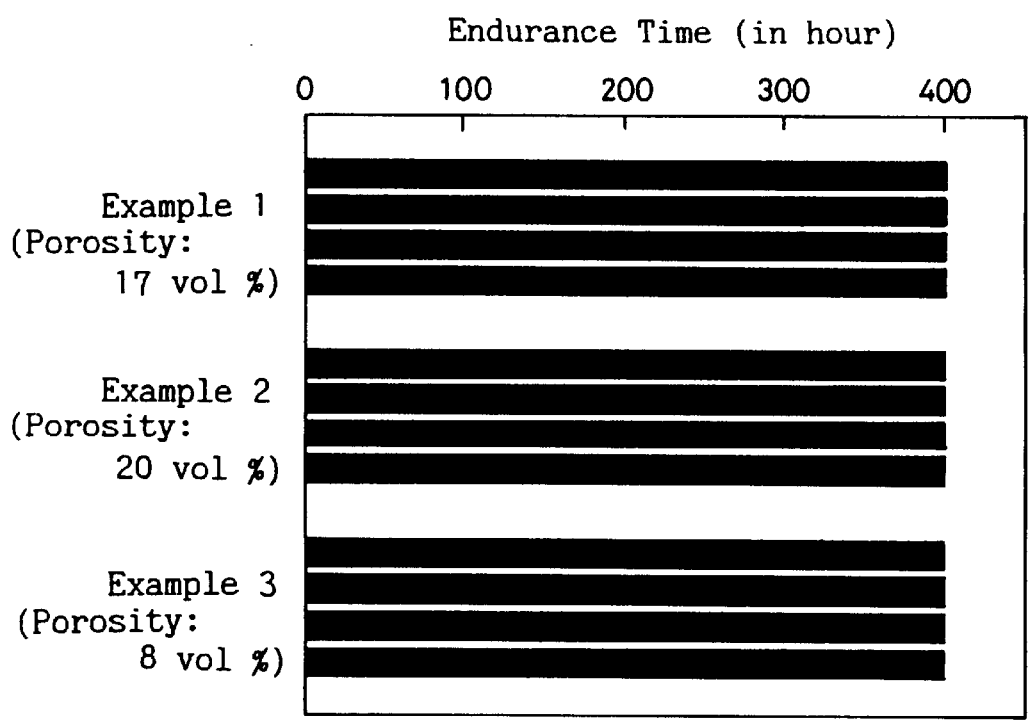
FIG. 4 is a graph showing the durability in time of Examples 1–3.

To evaluate the heat resistance of the rolling bearing 2 for sterilization and its durability in use, the following tests were carried out under the same conditions as in the actual use conditions. The lubricity and heat resistance of the retainer and the rolling bearing are shown in FIGS. 3–5.

(1) Test for measuring the change in the rate of oil contained in the bearing in a high-temperature atmosphere.

The retainer was let to stand at a temperature of 190° C., which is higher than an ordinary sterilizing temperature, for 150 hours consecutively to measure changes in the oil content (weight percent). The results are shown in FIG. 3.

(2) Endurance test after sterilization

Four bearings were prepared for this test. They were autoclaved 10 times (each for 30 minutes, using 135° C. vapor). They were then operated at 45×10⁴ rpm. The results of the test are shown in FIG. 4. The test was conducted for 400 hours maximum. It was terminated when judgment was made that it cannot withstand practical use due to overheat or noise.

COMPARATIVE EXAMPLE 1

A retainer was formed in exactly the same way as in Example 1 except that it was impregnated with a liquid paraffin oil instead of a fluorinated oil. It was subjected to the same tests as in Example 1.

As will be apparent from the results of FIG. 3, Comparative Example 1, which was impregnated with a paraffin oil, suffered a sharp drop in oil content at high temperatures. In contrast, Example 1, which is impregnated with a fluorinated oil, retained a sufficient amount of fluorinated oil at 190° C., a sterilizing temperature that will be required in the future. More specifically and as is apparent from the figure, Example 1 maintained an oil content at not less than 3.7% for more than 150 hours at this high temperature.

EXAMPLE 2

A retainer as shown in FIG. 2 was manufactured in exactly the same way as in Example 1 except that it was formed from a porous PI member (MELDIN 9000 by Dixon, 20% porosity in volume percent). Using this retainer, a rolling bearing for a hand-piece as shown in FIG. 1 was manufactured.

This rolling bearing for a hand-piece was subjected to Test 2. The test results are shown in FIG. 4.

EXAMPLE 3

A porous member (8% porosity in volume percent) was formed by compressing PI resin powder (UIP-S made by Ube Kosan) at 5000 kgf/cm, and calcining it at 400° C. in a nitrogen atmosphere. Except that this porous member was used, a rolling bearing assembly for a hand-piece as shown in FIG. 1 was manufactured in exactly the same way as in Example 1.

This rolling bearing for a hand-piece was subjected to Test 2. The test results are shown in FIG. 4.

COMPARATIVE EXAMPLE 2

A retainer identical in shape to Example 1 was manufactured by injection-molding a polyetherether ketone resin (made by ICI) while keeping the resin temperature at 380° C., and impregnating this resin with an fluorinated oil in exactly the same way as in Example 1. Using this retainer, a rolling bearing for a hand-piece as shown in FIG. 1 was manufactured.

This rolling bearing was subjected to Test 2. The results are shown in FIG. 5.

COMPARATIVE EXAMPLE 3

A rolling bearing for a hand-piece as shown in FIG. 1 was manufactured in exactly the same way as in Example 1 except that the retainer was formed from a PI resin member (UPIMOL S made by Ube Kosan, 0% porosity in volume percent).

This rolling bearing for a hand-piece was subjected to Test 2. The test results are shown in FIG. 5.

COMPARATIVE EXAMPLE 4

A rolling bearing for a hand-piece as shown in FIG. 1 was manufactured in exactly the same way as in Example 1 except that the retainer was formed from a porous PI resin member (MELDIN XM 246 made by Ube Kosan, 30% porosity in volume percent).

This rolling bearing for a hand-piece was subjected to Test 2. The test results are shown in FIG. 5.

As will be apparent from the test results shown in FIGS. 4 and 5, Comparative Example 2, formed by injection-molding a polyetherether ketone resin (0% porosity in volume percent), could withstand the predetermined sterilizing temperature for only 150 hours max. The retainers partially melted and worn near its pockets.

For Comparative Example 3, whose volumetric porosity was 0% though formed from a polyimide resin, the predetermined material, its durability as measured in time was mere less than 30 hours. Its retainer worn near its pockets.

Comparative Example 4, having a retainer formed from a PI resin material whose porosity in volume percent was higher than the predetermined range, suffered cracks when mounting it in a hand-piece, so that Test 2 was impossible. Namely, its durability was zero hours.

In contrast, Examples 1–3, which satisfy all the above-mentioned requirements, could withstand, after high-temperature sterilization, the endurance test under actual operating conditions for at least 400 hours.

What is claimed is:

1. A rolling bearing for supporting a shaft of a hand-piece to which a dental rotary cutting tool is detachably mounted, said rolling bearing comprising an inner member; an outer member rotatably mounted around said inner member; rolling elements disposed between said inner member and said outer member; a retainer for retaining said rolling elements in position, said retainer being a polyimide sintered member formed by sintering only polyimide resin powder, said sintered member having 5–20% by volume of pores, said pores communicating with each other; and a fluorinated oil impregnated into the sintered member so that said pores are filled with said fluorinated oil.

2. A rolling bearing as claimed in claim 1 wherein said fluorinated oil is perfluoropolyether.

3. A rolling bearing as claimed in claim 1 wherein said fluorinated oil is perfluoropolyalkylether.

* * * * *

UNITED STATES PATENT AND TRADEMARK OFFICE
CERTIFICATE OF CORRECTION

PATENT NO. : 6,113,278
DATED : September 5, 2000
INVENTOR(S) : Ohira

It is certified that error appears in the above-identified patent and that said Letters Patent is hereby corrected as shown below:

Item [54], please delete -- ROLLING BEARING FOR A DENTAL INSTRUMENT HAND-PIECE --, and insert ROLLING BEARING ASSEMBLY.

Signed and Sealed this

Twenty-first Day of August, 2001

Attest:

*Attesting Officer*

NICHOLAS P. GODICI
*Acting Director of the United States Patent and Trademark Office*